(12) United States Patent
Vissenberg et al.

(10) Patent No.: US 8,292,467 B2
(45) Date of Patent: Oct. 23, 2012

(54) ILLUMINATION DEVICE COMPRISING A LIGHT GUIDE

(75) Inventors: Michel Cornelis Josephus Marie Vissenberg, Eindhoven (NL); Anthonie Hendrik Bergman, Eindhoven (NL); Tim Dekker, Eindhoven (NL); Giovanni Cennini, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/993,283

(22) PCT Filed: May 25, 2009

(86) PCT No.: PCT/IB2009/052170
§ 371 (c)(1),
(2), (4) Date: Nov. 18, 2010

(87) PCT Pub. No.: WO2009/144650
PCT Pub. Date: Dec. 3, 2009

(65) Prior Publication Data
US 2011/0096570 A1    Apr. 28, 2011

(30) Foreign Application Priority Data

May 30, 2008  (EP) .................................. 08157267
Sep. 2, 2008  (EP) .................................. 08163464
Oct. 24, 2008  (EP) .................................. 08167518
Oct. 28, 2008  (EP) .................................. 08167731

(51) Int. Cl.
*F21V 7/00* (2006.01)
(52) U.S. Cl. ........ 362/309; 362/302; 362/339; 362/619; 362/620

(58) Field of Classification Search ................... 362/302, 362/309, 339, 615–626; 349/61, 62
See application file for complete search history.

(56) References Cited

U.S. PATENT DOCUMENTS

| | | | |
|---|---|---|---|
| 5,854,872 A * | 12/1998 | Tai | ................................ 385/133 |
| 6,379,017 B2 | 4/2002 | Nakabayashi et al. | |
| 6,601,984 B2 | 8/2003 | Yamamoto et al. | |
| 6,742,907 B2 | 6/2004 | Funamoto et al. | |
| 6,814,457 B2 | 11/2004 | Chang et al. | |
| 6,896,386 B2 | 5/2005 | Kitazawa et al. | |
| 7,025,482 B2 | 4/2006 | Yamashita et al. | |
| 7,181,378 B2 | 2/2007 | Benitez et al. | |
| 7,226,196 B2 | 6/2007 | Parker et al. | |
| 7,347,329 B2 | 3/2008 | Burns et al. | |
| 2002/0030984 A1 | 3/2002 | Ohkawa | |

(Continued)

FOREIGN PATENT DOCUMENTS

JP    2004200072 A    7/2004

(Continued)

*Primary Examiner* — Stephen F Husar
*Assistant Examiner* — Meghan Dunwiddie
(74) *Attorney, Agent, or Firm* — Mark L. Beloborodov

(57) ABSTRACT

The invention provides an illumination device (1) comprising a lighting unit (2). The lighting unit (2) comprises a light source (100) and a substantially flat light guide (200), arranged to collimate light source light (111). The light guide (200) has an entrance window (210), an edge window (220), a first light guide surface (201), a second light guide surface (202), a first side edge (230) and a second side edge (240). One or more of the first light guide surface (201) and the second light guide surface (202) comprise a plurality of grooves (300). In this way, latitudinal collimation is obtained.

13 Claims, 11 Drawing Sheets

U.S. PATENT DOCUMENTS

| | | | |
|---|---|---|---|
| 2003/0147621 A1 | 8/2003 | Agurok et al. | |
| 2007/0263388 A1 | 11/2007 | Lai et al. | |

FOREIGN PATENT DOCUMENTS

| | | |
|---|---|---|
| JP | 2005285586 A | 10/2005 |
| JP | 2005347122 A | 12/2005 |
| JP | 2006108045 A | 4/2006 |
| JP | 2007042402 A | 2/2007 |
| WO | 9815862 A1 | 4/1998 |
| WO | 9826212 A1 | 6/1998 |
| WO | 2007078941 A1 | 7/2007 |
| WO | 2007095049 A2 | 8/2007 |
| WO | 2008044018 A1 | 4/2008 |
| WO | 2008047278 A2 | 4/2008 |

\* cited by examiner

ILLUMINATION DEVICE COMPRISING A LIGHT GUIDE

FIELD OF THE INVENTION

The invention relates to an illumination device comprising a light guide and to such light guide per se.

BACKGROUND OF THE INVENTION

Relatively flat illumination devices are known in the art and are for instance described in U.S. Pat. Nos. 7,025,482 and 7,181,378.

U.S. Pat. No. 7,025,482 describes a light guide member and an illuminating device, which are able to efficiently uniformly irradiate illumination light to only an area requiring illumination. Therefore, a reflection face is constructed by reflection stripes such as many grooves, etc. widened in a concentric circle shape. Light from a light source unit is widened toward this entire reflection face without irregularities by a diffusing portion such as a reflection prism, etc. Thus, only the range actually requiring the illumination can be illuminated without irregularities, and visibility of the illumination range using a front light is raised.

U.S. Pat. No. 7,181,378 describes apparatuses, and methods for manufacturing such apparatuses, to convert a first distribution of an input radiation to a second distribution of output radiation. The apparatus can be defined in some embodiments by generating a two-dimensional representation of three active optical surfaces including calculating a segment of first, entry and second surfaces based on first second, and third generalized Cartesian ovals, respectively, and successively repeating the calculating of the segments of the first and second surfaces, and rotationally sweeping the two-dimensional representation about a central axis providing a three-dimensional representation. In some embodiments, portion of the first and/or second surfaces can be totally internally reflective (TIR). This document especially describes a folded-optics apparatus comprising a body that receives light, the body comprising first, second and third surfaces; the third surface defining a cavity, and at least a portion of the third surface is refractive; the second surface extending generally radially away from the cavity, and the second surface comprising a reflective region; and at least a first portion of the first surface provides internal reflection folding and at least a second portion of the first surface provides refractive transition between the body and an exterior of the body.

Further, WO2008047278 describes a luminaire comprising a light guiding layer and a plurality of LEDs, which LEDs are accommodated in at least one hole arranged in the light guiding layer, for emitting light into the light guiding layer. The light guiding layer further comprises at least one outcoupling structure, for coupling the light out of the light guiding layer.

SUMMARY OF THE INVENTION

The availability of efficient high-flux LED packages allows for luminaire designs of unconventional shape. Elegant, flat lighting systems can be based on light guiding plates, i.e. plates of dielectric material like PMMA, PC, glass, etc. The advantage of such systems can on the one hand be their elegant appearance (i.e. a design advantage), but on the other hand their unobtrusive appearance (the thin form factor allows them to easily blend with their surroundings, or be hidden against walls or ceilings). In general, the light direction in the plane of such a light guide plate may be manipulated in a straightforward manner (also indicated herein as "longitudinal collimation"): by using incoupling structures (e.g. collimating funnels or beam broadening structures). Manipulation of the orthogonal light direction (perpendicular to the plate) usually requires thickness variations in the plate in order to collimate (also indicated herein as "latitudinal collimation"). A thickness increase (as in the case of a light guide) is in general however unwanted, since it may deteriorate the slim appearance of the system. On the other hand, a wedge-like thickness-decrease may complicate manufacturability (in particular the thin edge), and generally may need additional light directing optics that add thickness.

Further, collimators may be used to couple light from a light source into a fiber or waveguide. A problem may be that the collimator may not easily be able to collimate all the light in the fiber or the waveguide, especially not in a fiber or waveguide thinner than the collimator and/or the light source.

Hence, a problem is how to manipulate the light distribution in all directions, especially the latitudinal collimation, without substantially varying the thickness of the light guide (or "collimator" or "waveguide"). The advantage of a system of substantially constant thickness is that it allows for elegant, thin luminaire designs that are relatively easy to manufacture, and which may relatively easily be installed as furniture (or furniture element) or implemented in furniture. Therefore, there is a desire to provide an alternative flat illumination device based on a light guide, and to further improve the beam shape of such flat light guides.

Hence, it is an aspect of the invention to provide an alternative illumination device, which preferably further at least partially obviates one or more of above-described drawbacks, and which preferably provides a collimated beam or a more collimated beam.

Further, it is an aspect to provide an alternative "coupler" or "light-in-coupling device" for use as device to couple light source light into a wave guide or a linear array of fibres, which preferably further at least partially obviates one or more of above-described drawbacks, and which preferably provides a collimated beam or a more collimated beam.

According to a first aspect, the invention provides an illumination device arranged to generate illumination device light (herein also indicated as "device light"), the illumination device comprising a lighting unit, the lighting unit comprising a light source, arranged to generate light source light, and a substantially flat (planar) light guide, arranged to collimate the light source light, the light guide having an entrance window and an edge window, a first light guide surface (herein for the sake of understanding also indicated as "top light guide surface" or "top surface") and a second light guide surface (herein for the sake of understanding also indicated as "bottom light guide surface" or "bottom surface"), which are arranged substantially parallel, a first side edge and a second side edge, wherein the first side edge and the second side edge are arranged not to diverge or converge from the entrance window in the direction of the edge window (and which may, in an embodiment, be arranged substantially parallel) wherein the entrance window is arranged to receive the light source light of the light source, wherein the edge window is arranged to allow the collimated light source light escape from the light guide as illumination device light, and wherein one or more of the first light guide surface and the second light guide surface comprise a plurality of grooves, and wherein the grooves are arranged to diverge in a direction from the entrance window to the edge window.

It surprisingly appears that such device may provide a beam with advantageous beam shape, which may be well collimated in both longitudinal and latitude direction: such illumination device may be relatively flat, but nevertheless have a collimation in the plane of the waveguide or light guide but surprisingly also perpendicular to the light guide. It appears that this collimation may be obtained by introducing grooves in one or more of the first light guide surface (also indicated herein as "top surface") and the second light guide surface (also indicated herein as "bottom surface"), and thus without substantially further introducing widening or narrowing features. Hence, in this way a flat light guide may be provided, having collimation in both directions, but especially in a plane perpendicular to the first light guide surface and the second light guide surface.

The phrase "wherein the first side edge and the second side edge are arranged not to diverge or converge from the entrance window in the direction of the edge window" indicate for instance that the width of the device at the entrance window may substantially be the same as at the edge window. This may include one or more slanted first and second side edges. This may also include one or more curved first and second side edges, which are curved in the direction of the first to the second light guide surface (or vice versa). When the side edges are substantially parallel, the first side edge and the second side edge are by way of definition arranged not to diverge or converge from the entrance window in the direction of the edge window. State of the art collimators have in general a first side edge and a second side edge that are arranged to diverge from the entrance window in the direction of the edge window.

Herein, terms like "perpendicular", "parallel", "planar", "flat", and "equal", etc., especially relate to embodiments with substantial perpendicular, substantial parallel, substantial planar, substantial flat and substantially equal, etc., features, as will be clear to the skilled person in the art. Hence, "parallel" or "substantially parallel" may relate to angles of features of about 0°, but especially less than about 6°, more preferably less than about 2°, even more preferably less than about 1°. Likewise, "perpendicular" or "substantially perpendicular" may relate to angles of about 90°, but especially angles deviating less than about 6°, more preferably less than about 2°, even more preferably less than about 1°, from 90°.

In a specific embodiment, the first light guide surface and the second light guide surface define a light guide height, wherein the first side edge and a second side edge define a light guide width, and wherein the width/height ratio is in the range of about 1-100. Especially in this way, a flat device may be provided. Preferably, the width/height ratio>1, such as ≧2, or ≧5.

The light guide and the lighting unit may further comprise an optical axis, which can be used to define the orientation of for instance the grooves; the grooves may independently have a longitudinal axis having a groove direction angle with the optical axis≧0° and <90°.

The term "independently" herein may indicate that, within physical boundaries, the groove direction angle of each individual groove may be selected independent from all other grooves. Especially in radially arranged grooves, this will be the case and the groove direction angle may be different for each groove.

The light guide of the invention may also be interpreted as a waveguide having collimating properties.

In an embodiment, one or more of these side edges may also have a plurality of grooves, which may even further enhance collimation. Therefore, one or more of the first side edge and the second side edge comprise a plurality of grooves, respectively, wherein the plurality of grooves comprised by the one or more of the first side edge and the second side edge are preferably substantially parallel, respectively. Preferably, both the first side edge and the second side edge comprise the plurality of grooves, respectively. Herein the phrase "wherein the plurality of grooves comprised by the . . . . side edge are substantially parallel" indicates that when a plurality of grooves on/in a side face is applied, these grooves are especially arranged parallel to each other, i.e., the grooves may have elongation axes (or longitudinal axes), which are substantially parallel, and are thus also substantially parallel to the first light guide surface and/or the second light guide surface.

The phrase "wherein the grooves are arranged to diverge in a direction from the entrance window to the edge window" indicate that the grooves are radially arranged, and diverge from each other (on the first light guide surface or second light guide surface, respectively).

In a preferred embodiment, the plurality of grooves (comprised by the first light guide surface and/or second light guide surface, respectively) may virtually converge at a position coinciding with the light source (i.e., a position "upstream" of the light guide). Here the phrase "position coinciding with the light source" indicates the position of the light source where the light source emits light (i.e. its light emitting part (like the light emitting surface of an LED, the discharge of a discharge source, or the filament of an incandescent type of lamp)). Note that the illumination device may have a light source that can be considered in approximation as a point source, but may also have a line source (such as a luminescent tube; TL), which may then especially be arranged substantially perpendicular to the first light guide surface and/or the second light guide surface. When the plurality of grooves virtually converge at a position coinciding with the light source, the best collimation may be obtained. However, the plurality of grooves may virtually converge at a position upstream of the light source (i.e. a position "upstream" of the light guide and of the light source), for instance within about 0-100 cm, like about 0-10 cm. Choosing the convergence allows controlling the collimation. The amount of latitudinal collimation may be a measure of the effectiveness of the grooves. When the convergence point lies more upstream, the latitudinal collimation may relatively be worse, but the longitudinal collimation relatively becomes better.

Preferably, the plurality of grooves may virtually converge at a position upstream of the light guide within about 0-105 cm, like about 0-15 cm. This implies that plurality of grooves may virtually converge at a position upstream of the entrance window within about 0-105 cm. Note that the convergence position may in principle differ for both the first light guide surface and the second light guide surface.

The grooves may also be indicated as elongated structures. In an embodiment, the grooves have V-shape profiles. In another embodiment, the grooves have curved profiles, such as sine like shapes. As will be clear to a person skilled in the art, combinations of differently shaped grooves may also be applied.

Due to the nature of the illumination device, the grooves may have an elongation axis (herein also indicated as "longitudinal axis" of the groove). Preferably, a part of the total number of the grooves (such as 10-100%, especially 20-100% of the total number of grooves) have a length in the range of about 50-100% of a length of the light guide surface (s) by which they are comprised, respectively. The grooves may have a constant width and/or height, or the width and/or height, independently of each other, may vary over the light guide. In this way, the entire surface of the light guide surface (s) may comprise the grooves, respectively, but it may also be chosen to leave spaces between two adjacent grooves.

In an embodiment, the light source comprises a LED, such as a high power LED. In another embodiment, the light source comprises a plurality of LEDs (light emitting diodes). The plurality of LEDs may in an embodiment comprise LEDs of the same emission color, but may in an embodiment also comprise LEDs of different emission colors (such as yellow and blue LEDs, or red, green and blue LEDs, etc.).

The light source may also comprise other light sources than LEDs, such as for instance compact fluorescent lamps or halogen lamps. The light source may also comprise a laser diode, etc. In addition to the light source, further also luminescent materials may be applied, to convert at least part of the light of the light source into light having another wavelength.

The light guide may comprise a solid transparent light guide but may also comprise a hollow light guide. In an embodiment, the entrance window and/or the edge window are open windows, i.e. no transparent material (other than air) is present. In such embodiments, the light guide may essentially be composed of first and second light guide surface and the side edges.

However, in a preferred embodiment, the light guide comprises a solid transparent light guide, especially a planar solid transparent light guide (such as a plate). The solid transparent light guide may comprise a material selected from the group consisting of PET (polyethylene terephthalate), PE (polyethylene), PP (polypropylene), PC (polycarbonate), P(M)MA (poly(methyl)metacrylate), PEN (polyethylene napthalate), PDMS (polydimethylsiloxane), and COC (cyclo olefin copolymer). PMMA may give for instance good results. However, the solid transparent light guide may also comprise a material selected from the group consisting of inorganic transparent materials. Preferred inorganic materials are selected from the group consisting of glasses, (fused) quartz, ceramics, and silicones, especially glass.

When the light guide comprises a solid transparent material, due to total internal reflection (TIR), the first and/or second light guide surface do not necessarily comprise a reflective material, since they may be arranged to be reflective due to TIR.

The edge window is especially arranged opposite the entrance window (and may especially be arranged perpendicular to the optical axis). The edge window may be arranged as exit window, i.e. light (more precisely collimated light source light) light escapes from the light guide at this edge, but may also be arranged to reflect the collimated light from the light guide and escape in this way from the light guide. Hence, the edge window is arranged to allow the collimated light source light escape from the light guide. The optical axis may be considered as the average direction of the light, which is determined by the orientation of both the source and the light guide.

Hence, in an embodiment the edge window may be arranged to provide the device light. In another embodiment, the edge window is arranged to reflect the light source light to the exterior of the illumination device, thereby providing illumination device light. The edge window may also be indicated as outcoupling structure, which is arranged to couple the light, either "directly" via transmission through the edge window or "indirectly" via reflection and subsequent transmission (especially through one of the first or the second light guide surface).

To provide outcoupling of light in a direction other than parallel to the light guide, the edge window may be slanted. Hence, in an embodiment the edge window has a slant angle relative to the first light guide surface or the second light guide surface in the range of 35-105°. Hence, in an embodiment, the edge window has a slant angle relative to the first light guide surface or the second light guide surface in the range of about 75-105°, such as about 85-95°, such as 90° (in fact this may called "unslanted"). In another embodiment, the edge window has a slant angle relative to the first light guide surface or the second light guide surface in the range of about 35-55°, especially about 40-50°, more especially about 45°. Slant angles in the range of about 75-105° are especially useful when the edge window is arranged to transmit the light and couple this light source light out as illumination device light. Slant angles in the range of about 35-55° are especially useful when the edge window is arranged to reflect the light source light and couple this light source light out as illumination device light via the first or the second light guide surface. In the former embodiment, the edge window may further comprise a diffuser; in the latter embodiment, the edge window may further preferably comprise a reflector.

The edge window may also be curved, both in a direction from the first light guide surface to the second light guide surface and/or in a direction to from the first side edge to the second side edge. Assuming an edge window comprising a solid transparent material, the edge window may be flat (including slanted), may be curved, but may also be facetted. Hence, in an embodiment, the light guide comprises a facetted edge window. Combinations of such embodiments may also be possible.

When the light guide comprises a solid transparent material, and the edge window is slanted, the edge window is especially arranged to reflect the light source light to the exterior of the illumination device, thereby providing device light. In such embodiments, the edge window may further optionally comprise a reflector or a diffuser. Outcoupling of the light may in such embodiment occur via the first or the second light guide surface.

In another specific embodiment, the edge window has a V-shape profile, i.e. it has a slant angle relative to the first light guide surface and has another slant angle relative to the second light guide surface. Such embodiment may be applied to couple light out to both sides of the illumination device, it to a side away from the first light guide surface and to a side away from the second light guide surface.

In an embodiment, the light guide may comprise a plurality of (slanted) edge windows. This may for instance be obtained by providing additional reflective (slanted) surface(s) in the light guide, for instance by introducing (slanted) slits (herein also indicated as air slits) in the light guide. Such (slanted) slits may also act as reflectors (like a slanted edge window), and thereby act as additional edge windows. The slant angles of the individual edge windows may be independent of each other.

Note that the slant angle may in principle also vary over edge window (i.e. vary in a plane perpendicular to the central axis). As mentioned above, the slanted edge window may further comprise a reflector or a diffuser.

The combination of a light source and the light guide (the lighting unit) can be used per se as illumination device, but may also be integrated in a larger entity, especially a plate. Such plate may for instance comprise a plurality of the lighting units, but may in an embodiment also comprise a single light source and a plurality of light guides (arranged to receive light source light from the light source.

The invention is also directed to the light guide per se. Hence, according to a further aspect, the invention provides a substantially flat light guide, arranged to collimate light source light of a light source, the light guide having an entrance window and an edge window, a first light guide surface and a second light guide surface, which are arranged substantially parallel, a first side edge and a second side edge, which are arranged not to diverge or converge from the entrance window in the direction of the edge window (and which may in an embodiment be arranged substantially parallel), and wherein the entrance window is arranged to receive the light source light of the light source, wherein the edge window is arranged to allow the collimated light source light escape from the light guide as illumination device light, wherein one or more of the first light guide surface and the second light guide surface comprise a plurality of grooves, and wherein the grooves are arranged to diverge in a direction from the entrance window to the edge window.

Such light guide may be used in the illumination device as described above, but may also be used as "coupler" or "light in-coupling device" to couple light of a light source into a light guide, such as a planar waveguide or a linear array of fibers.

Hence, in an aspect a light guide collimator construction is provided, comprising the light guide a light guide funnel part, wherein the light guide is arranged to collimate light source light of a light source and to provide collimated light to the light guide funnel part. Such construction can be used to collimate the light source light, and couple this light into a waveguide, while narrowing down dimensions (funneling), especially the dimension perpendicular to the light guide. Therefore, the invention further provides in an embodiment such light guide collimator construction, which further comprising a waveguide), wherein the light guide and the light guide funnel part are arranged to provide collimated light to the waveguide.

Therefore, the invention also advantageously provides an embodiment of the light guide collimator construction, wherein the waveguide comprises a cladding having a low-index of refraction. Further, the invention advantageously provides an embodiment of the light guide collimator construction, wherein the collimator has a collimator height and wherein the waveguide has a waveguide height, wherein the waveguide height is smaller than the collimator height, or even smaller than the light source height. This allows narrowing down of dimensions, while still efficiently coupling light into the light guide, such as a planar waveguide or a linear array of fibers.

Note that the terms first and second, and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Note that the terms "bottom" and "top", amongst others used in the detailed description below, are only used to elucidate in a clear way the different elements, such as faces of objects. The use of the terms "bottom" and "top" does not limit the illumination device or the light guide, etc., of the invention as claimed, neither its use, to the configurations schematically depicted in the accompanying drawings. In addition, illumination devices arranged in other configuration (such as upside down, or rotated under any desired angle) than as depicted are claimed herein.

For instance, the illumination device may be arranged with the bottom light guide surface up and the top light guide surface down. Also, both surfaces may for instance be arranged substantially vertical, and thus in a specific embodiment the entrance window being substantially horizontal (or also vertical, depending upon the arrangement). Likewise, depending upon the configuration of the illumination device, etc., the side edges may be up and down, respectively, of vice versa. However, the terms "bottom", "top", and side edges are only used to elucidate in a clear way the different elements, such as faces of objects. The bottom and top light guide surfaces are those surfaces of which at least one comprises grooves, whatever the orientation of the illumination device, light guide, etc., may be. Especially in embodiments wherein the width/height ratio is in the range of about 1-100 (see above) and especially wherein the width/height ratio>1, such as $\geq 2$, or $\geq 5$, it will be clear to a person skilled in the art what the side edges, in relation to the top and bottom light guide surfaces are. It is further referred to the accompanying drawings (see also below). Therefore, instead of the terms "top" and "bottom", also the terms "first" and "second", etc., are herein used.

The terms "upstream" and "downstream" relate to an arrangement of items or features relative to the propagation of the light from the light source, wherein relative to a first position within a beam of light from the light source, a second position in the beam of light closer to the light source is "upstream", and a third position within the beam of light further away from the light source is "downstream".

BRIEF DESCRIPTION OF THE DRAWINGS

Embodiments of the invention will now be described, by way of example only, with reference to the accompanying schematic drawings, in which non-limiting substantially planar light guides are schematically depicted, in which corresponding reference symbols indicate corresponding parts, and in which.

Figure 1A:
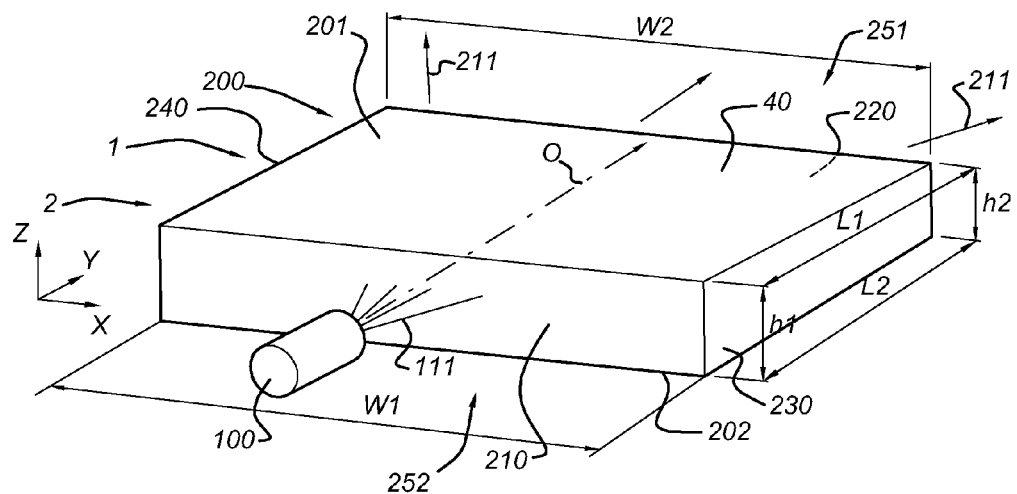
FIGS. 1a-1d schematically depict some principles of embodiments of the light guide.

For the sake of clarity, optional further optics or (other) peripheral equipment, such as reflectors, mirrors, heat sinks, diffusers, further light guides, power sources, electric wires, luminescent materials, etc. have not been depicted in the drawings.

DESCRIPTION OF PREFERRED EMBODIMENTS

Figure 1B:
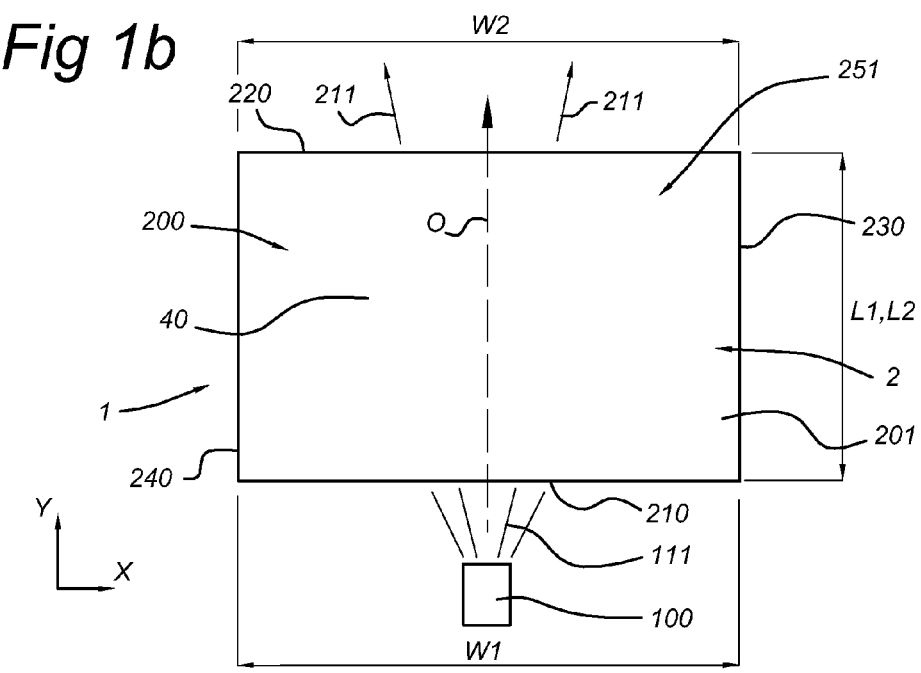
Figure 1C:
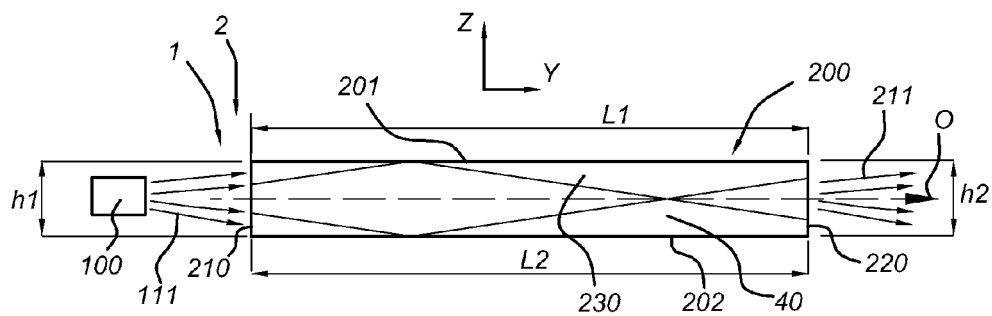

FIGS. 1a-1c schematically depicts an illumination device 1 arranged to generate device light 211. The illumination device 1 comprising a lighting unit, indicated with reference 2. The lighting unit 2, comprises a light source 100, arranged to generate light source light 111, and a substantially flat light guide 200, arranged to collimate the light source light 111 and provide the device light 211.

The light source 100 may be any light source, but may especially be a LED (including a plurality of LEDs).

The light guide 200 is a waveguide, which may be solid or hollow. It may also comprise a plurality of linearly arranged fibers. Herein, it is further referred to solid light guides, which are indicated with reference 40. The light guide 200 has an entrance window 210 and an edge window 220, a top light guide surface 201 ("top surface") and a bottom light guide surface 202 ("bottom surface"), which are preferably arranged substantially parallel, a first side edge 230 ("first side edge") and a second side edge (240) ("second side edge"). The first side edge 230 and the second side edge 240 are edges of the light guide 200 and may be arranged substantially parallel (see further below). The first and the second side edges 230 and 240 are thus preferably not arranged to diverge or converge from the entrance window 210 to the edge window 220. Hence, a light guide entrance window width W1, at the entrance window 210, is preferably substantially equal to a light guide edge window width W2, at the exit window 220. Hence, the width of the light guides 200 with side edges 230,240 is herein further indicated as width W1. In an embodiment (as herein schematically depicted), the first side edge 230 and the second side edge 240 are substantially perpendicular to the top light guide surface 201 and the bottom light guide surface 202.

Note however, that the herein depicted embodiments of the light guide 200 are depicted with parallel side edges 230,240 with are substantially perpendicular to the top light guide surface 201 and the bottom light guide surface 202. However, the side edges 230,240 may also be arranged different, such as curved (in a direction from the top and bottom light surface), slanted, etc. The side edges 230,240 may also be absorbing or reflecting, slanted or parallel, etc., depending on the desired construction.

As mentioned above, the top light guide surface 201 and bottom light guide surface 202 are preferably arranged substantially parallel, which can also be derived from this schematic drawing, since a light guide entrance window height h1 is substantially equal to a light guide edge window height h2. In general, h1/h2 will be in the range of about 0.9-1.1, preferably about 1. Preferably, here the term "substantially parallel" indicates that an angle by the top light guide surface 201 and bottom light guide surface 202 is especially less than about 6°, more preferably less than about 2°, even more preferably less than about 1°, and most preferably 0°. Herein, the embodiments are depicted with parallel top light guide surface 201 and bottom light guide surface 202. Hence, the height of the light guides 200 with which are substantially flat is herein further indicated as height h1. Therefore, the top light guide surface 201 and the bottom light guide surface 202 thus define a light guide height h1 and the first side edge 230 and the second side edge 240 define a light guide width W1. Especially, the width/height ratio W1/h1 is in the range of about 1-100, preferably 2-50.

The length of the edges 230,240 along the top face 201 is indicated with reference L1 and the length of the edges 230, 240 along the bottom face 202 is indicated with reference L2. In this schematic drawing, without slanted edges, L1 and L2 are substantially equal. Therefore, the length of the edges 230,240 may also be indicated with L1.

In preferred embodiments, the W1/L1 ratio is in the range of about 0.1-10, especially in the range of about 0.5-5, especially 0.5-2, and more especially about 0.9-1.1, such as about 1. Hence, in an embodiment, the first side edge 230 and the second side edge 240 define the light guide width W1 and the first side edge 230 and the second side edge 240 have side edge length L1, wherein width/length ratio W1/L1 is in the range of 0.5-2. Preferably, the height h1<W1, i.e. the ratio W1/h1>1 (see also above).

The entrance window 210 is arranged to receive the light source light 111 of the light source 100 and the edge window 220 is arranged to allow the collimated light source light 111 escape from the light guide 200 as illumination device light 211.

For the sake of understanding, an optical axis O is depicted, along which the collimated light source light 111 and the device light 211 propagates. This optical axis O is the optical axis of the lighting unit 2. The optical axis O may be considered as the average direction of the light 111, which may be determined by the orientation of both the source 100 and the light guide 200. As will be clear to the person skilled in the art, these are preferably aligned. Since the optical axis can be considered as the average direction of the light 111, it is herein indicated as vector, showing the downstream direction of the light 111. As will be clear to the person skilled in the art; the optical axis can also be defined in the absence of the light source 111.

Figure 2A:
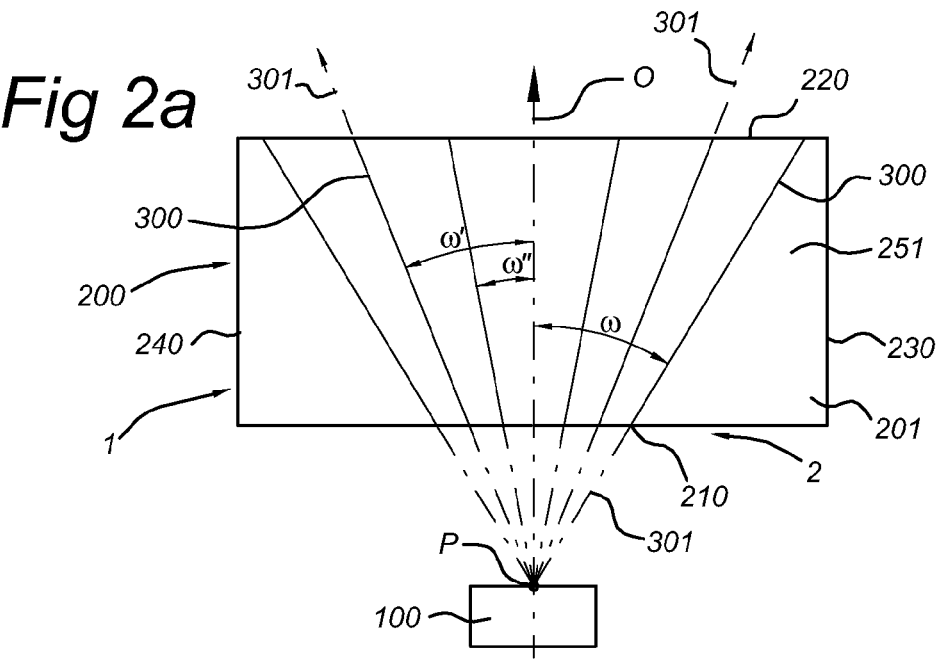
FIGS. 2a-2d schematically depict embodiments of the light guide.
Figure 2B:
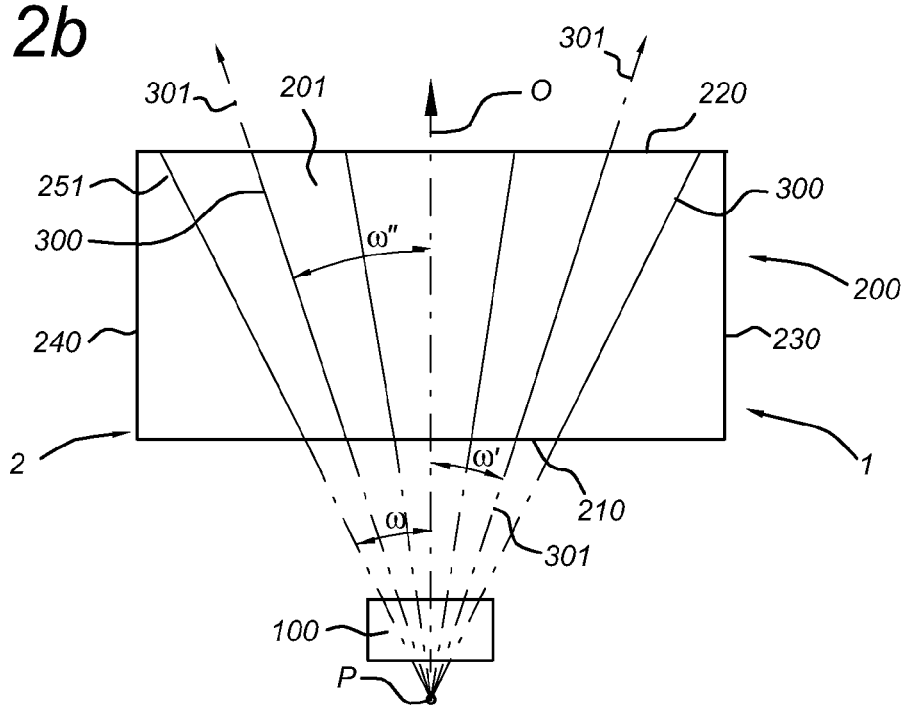

This optical axis O is especially in a plane substantially parallel to the top light guide surface 201 and/or bottom light guide surface 202: The optical axis O partly coincides with a (virtual) plane parallel with the xy-plane and is also parallel to this plane parallel with the xy-plane (this plane is indicated in FIGS. 2a and 2b). The xy-plane can further be defined as a plane substantially parallel to the top face 201 and/or the bottom face 202. As mentioned above, the top and bottom faces 201,202 are (substantially) parallel in preferred embodiments. Hence, the xy-plane is (substantially) parallel to the top face 201 and bottom face 202. The optical axis O is parallel to this plane and coincides with this plane parallel with the xy-plane.

FIG. 1b schematically depicts the same light guide 200 as schematically depicted in FIG. 1a, but now in top view. Hence, in this schematically depicted embodiment and in this view, L1 and L2 are substantially equal, and W1 and W2 are substantially equal.

In an embodiment, the side edges 230,240 may be arranged substantially parallel, but optionally, one or more of the side edges 230,240 are curved in a direction from the top surface 201 to the bottom surfaces 202 (or vice versa). Such embodiments are herein not depicted.

FIG. 1c schematically depicts the same light guide 200 as schematically depicted in FIG. 1a, but now in side view. Hence, in this schematically depicted embodiment and in this view, h1 and h2 are equal, and L1 and L2 are equal.

Figure 1D:
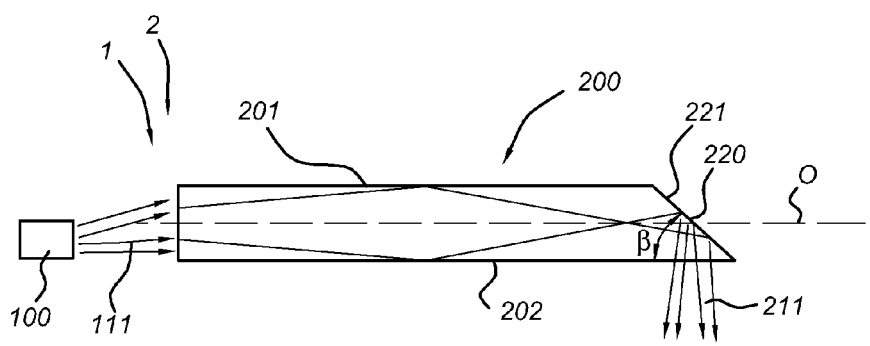

FIG. 1d schematically depicts an embodiment of the lighting unit 2 with light guide 200, which is substantially the same as the embodiments schematically depicted in FIGS. 1a-1c, with the exception that the edge window 220 is slanted. Such slanted edge window is indicated with reference 221. The edge window 220 may for instance have a slant angle β relative to the top light guide surface 201 or the bottom light guide surface 202 in the range of 35-105°. In FIG. 1d, the slant angle β is indicated relative to bottom face 202, and has a value of about 45°. In FIGS. 1a-1c the edge window is not "slanted", and the "slant angle β" is about 90°. By using a slant angle, especially in the range of about 35-55°, collimated light source light may escape from the light guide 200 via one of the bottom and top surfaces 201,202 as device light 211. Depending upon the shape of the edge window 220 (slanted, V-shape ("double slanted"), curved), the collimated light source light may escape from the light guide 200 as device light 211 via one or both of the bottom and top surfaces 201,202.

As mentioned above, one or more of the top light guide surface 201 and the bottom light guide surface 202 comprise a plurality of grooves 300. Note that the arrangement of the grooves on one or more of these faces may be selected independent from each other, for instance: the bottom surface 202 may comprise grooves and the top surface 201 may not comprise grooves 300, etc. Therefore, the phrase "one or more" is applied.

These grooves 300 are for the sake of simplicity not drawn in the above schematic drawings. Having however described the lighting unit 2, and especially the light guide 200, in FIGS.

1a-1d, in the next figures, the arrangement of the grooves is schematically depicted and below further elucidated in more detail. FIGS. 2a-2d schematically depict embodiments of grooves 300 comprised by the top or bottom surfaces 201, 202.

The groove(s) 300 can be seen as elongated structure(s), having a longitudinal axis (or elongation axis or groove axis) 301 along or in the direction of the groove 300. Thus, in an embodiment grooves 300, or at least a subset thereof, are arranged substantially parallel. In another embodiment, that may be combined therewith, grooves 300, or at least a subset thereof, are arranged diverging in a downstream direction. Therefore, the grooves 300 are considered to have a groove axis 301 (which is parallel with the groove 300 and may coincide with the groove valley), and which is also indicated with a vector (with a downstream direction). A further reason to indicate the groove axis 301 as vector, is to define a groove direction angle ω of the groove axis 301 with the optical axis O. Assuming the optical axis O to be parallel to the y-axis in a Cartesian coordinate system (as depicted in some of the figures), a groove 300 having a direction angle ω of 90° would be along the positive or negative x-axis, which would not provide the advantageous collimation according to the invention. A groove 300 having a direction angle ω of 0° would be parallel the optical axis O, and may provide collimation. Actually, the direction angle ω is more precisely defined as the angle between a projection of the groove axis 301 on a plane parallel with the xy-plane and containing the optical axis O, and the optical axis O in this plane.

FIGS. 2a-2d schematically depict embodiments of the light guide 200 having a plurality of grooves 300 comprised by the top and/or bottom light guide surfaces 201,202, respectively. For the sake of clarity, the side edges 230,240 do not comprise grooves 300, but of course, in a further embodiment, grooves 300 may also be comprised by one or more of these side edges 230,240.

Figure 2C:
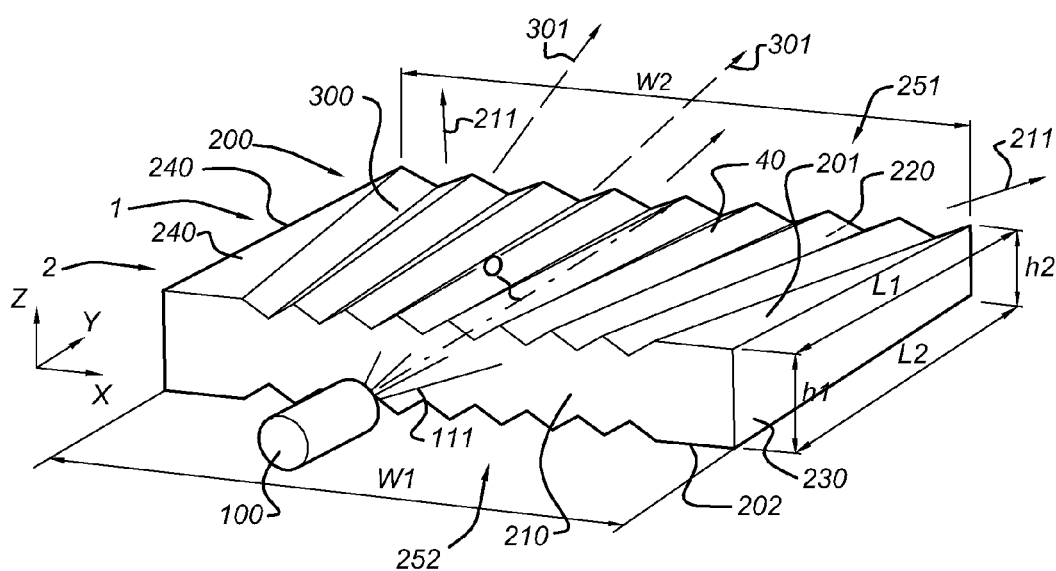
Figure 2D:
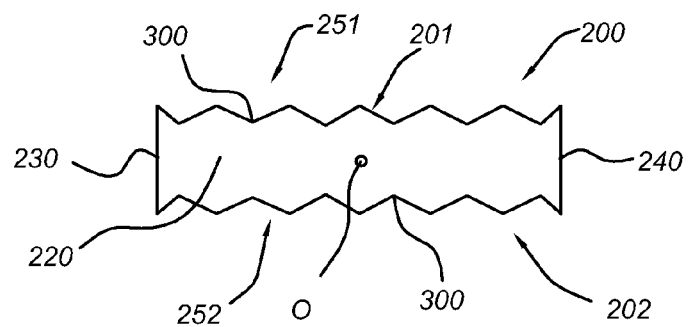

The top and bottom light guide surfaces 201,202 having grooves 300 are indicated with references 251 and 252, respectively. FIGS. 2a and 2b schematically depict top views, and (thus) show top light guide surface 201, here with grooves 300, thus also indicated with reference 251. However, these schematic pictures might correspondingly also schematically depict bottom light guide surface 202 comprising grooves 300, thus to be indicated with reference 252. FIG. 2d schematically shows a front view of the edge window 220 of an embodiment of the light guide 200; in this figure it is schematically depicted that both top and bottom light guide surfaces 201,202 having grooves 300.

The grooves 300 have again longitudinal axes 301 along or in the direction of the groove 300 with groove direction angle ω with the optical axis O. Each groove 300 may independently have a longitudinal axis 301 having a groove direction angle ω with the optical axis O≧0° and <90°. The virtual convergence point P may be arranged behind (i.e. upstream from) the light source 100 (see FIG. 2b), before the light source 100, or at the light source 100 (FIG. 2a). In principle, the grooves 300 of one or more of the top light guide surface 201, the bottom light guide surface 202, the first side edge 230 and the second side edge 240, may converge at different positions P. In FIGS. 2a-2c, the arrangement of the grooves 300 is a radial arrangement, wherein the centre of the circle is at convergence point P.

The arrangement wherein the grooves 300 are comprised by one or more of the top and bottom light guide surfaces 201,202, and wherein the grooves 300 virtually converge at a position substantially coinciding with the light source 100 (i.e. especially substantially coinciding with the light emitting surface of such light source 100), is especially preferred since relatively high latitude collimation may be obtained (see also below).

The groove(s) 300 may for instance easily be provided by providing groove(s) 300 into one or more (of the side edges 230,240 and) top and bottom surfaces 201,202, of especially a solid transparent light guide 40. By introducing V-shape groove(s) 300 or sinus-shape groove(s) 300 or other types of groove(s) 300, relatively easily the groove(s) 300 are provided, with reflective (due to (total) internal reflection (TIR) at the face(s) of the groove(s) 300. Such groove(s) may be obtained by etching or carving groove(s), thereby obtaining the grooves 300. However, other methods known to the person skilled in the art may also be applied, like injection moulding, or hot embossing, or replication of the groove, or laser cutting.

The grooves 300 comprised by the top or bottom surfaces 201,202 may for instance have a height in the range of about 0.05-2 mm.

The grooves 300 may be directly neighboring, but there may also be a distance between adjacent grooves 300. The grooves 300 may have a constant width and/or height, or the width and/or height, independently of each other, may vary over the length of the groove. In this way, the entire surface of the one or more of the top light guide surface 201 and the bottom light guide surface 202 may comprise the grooves 300, but it may also be chosen to leave spaces between two adjacent grooves 300.

In a preferred embodiment, especially in a radial arrangement of the grooves 300 comprised by the top light guide surface 201 and/or the bottom light guide surface 202 (see FIG. 2a-2c), such surface comprises at least 1 groove 300 per 10° light guide azimuth angle, especially in the range of about 1-5 grooves 300 per 10° light guide azimuth angle (in the very schematic drawing 2c, by way of example 8 grooves 300 per 180° azimuth angle are depicted). In these embodiments, with radially arranged grooves 300, the groove angle ω varies over the top and/or bottom surfaces 201, 202, respectively. This is indicated in FIGS. 2a-2c with ω, ω', ω", etc.

As discussed above, the grooves 300 need not be V-grooves with a 90° top angle. E.g. V-grooves with other top angles, sinusoidal patterns or other curved patterns may also effective. The top angles of V-grooves is especially in the range from about 90° up to an angle<180°. This may also apply to the grooves 300 comprised by one or more of the side edges 230,240. However, in a preferred embodiment, especially in those embodiments wherein the grooves 300 converge to a virtual point P at the light source 100, the grooves 300 are V-grooves with 90° top angles. It appears that in such embodiments, lateral collimation is relatively good.

Hence, the invention provides an embodiment of the illumination device 1 comprising the lighting unit 2, as defined above, wherein one or more of the top light guide surface 201 and the bottom light guide surface 202 comprise a plurality of grooves 300, wherein the grooves 300 are arranged substantially radially with one or more convergence points P chosen upstream of the light guide 200 (and preferably at or upstream of the light source 100). Or, in other words, an embodiment of the illumination device 1 comprising the lighting unit 2, as defined above, is provided, wherein one or more of the top light guide surface 201 and the bottom light guide surface 202 comprise a corrugated structure of radially arranged grooves 300, diverging in a direction from the entrance window 210 to the edge window 220.

Figure 3A:
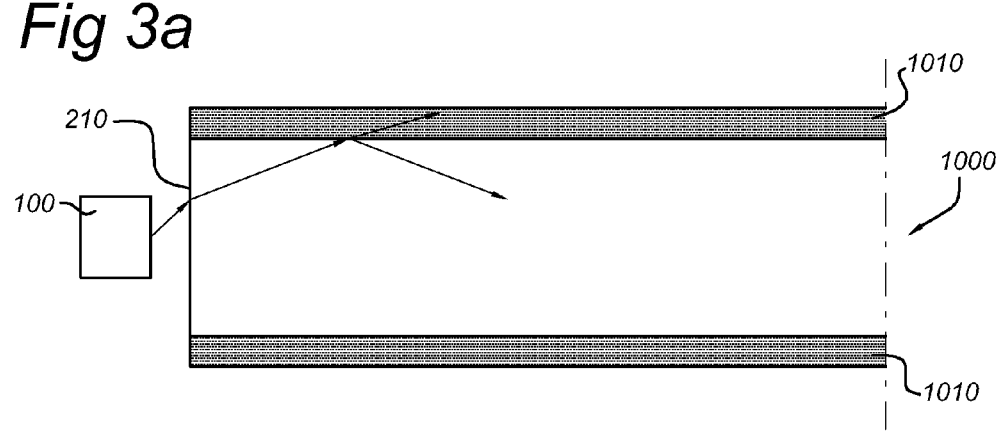
FIGS. 3a-3e schematically depict embodiments of the light guide collimator construction.
Figure 3B:
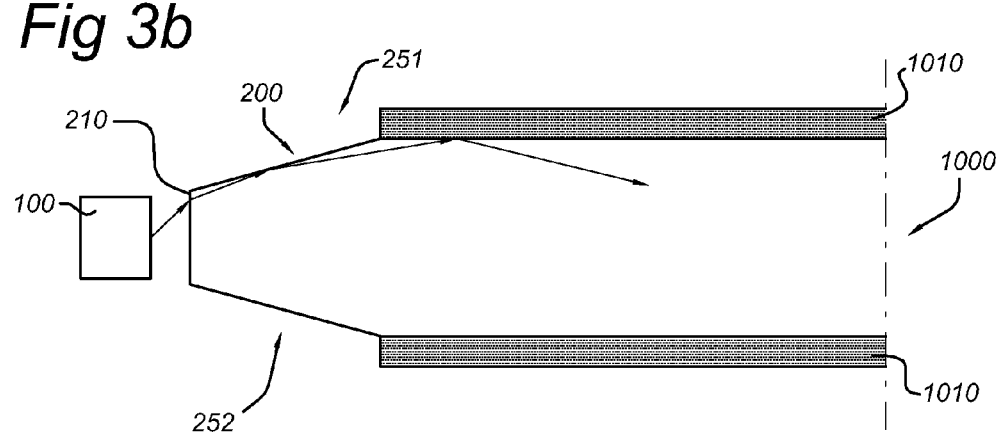

FIGS. 3a-3b (inside view) schematically depict wave guides into which light is coupled. The waveguides are indicated with reference 1000. Wave guides are often provided with a low-index layer or cladding (cladding is indicated with reference 1010) in order to avoid light leakage caused by dust or scratches. The basic idea is that light does not enter the low-index layer due to total internal reflection at the light guide—cladding interface. Consequently, scratches or dust at the cladding surface have no effect on the light. For the cladding 1010 to work properly, the light preferably has a large incidence angle onto the cladding, i.e. the light from light source 100 should preferably be sufficiently collimated in the direction perpendicular to the cladding. See FIG. 3a for an illustration of a conventional system with cladding 1010, in which not-collimated light may enter the cladding layer. FIG. 3b shows a conventional tapered collimator 200 at the entrance of the light guide 1000 to avoid light entering the cladding layer 1010. For thin light guide systems, it is usually complicated to collimate light in the conventional way, i.e. by a tapered collimator (see FIG. 3b).

Figure 3C:
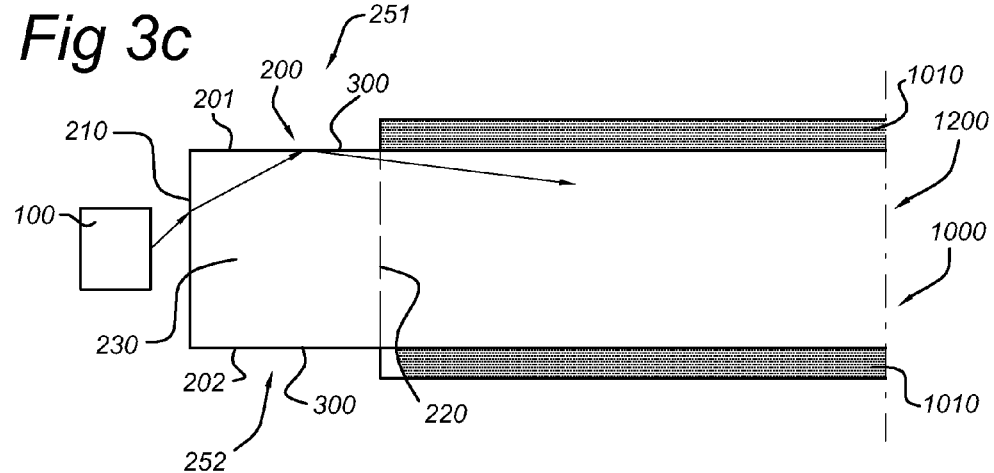

However, the flat collimators 200 proposed in the present invention are very well suited for this: the flat collimator 200 based on diverging grooves 300 (see FIGS. 2a-2d) can collimate light 111 in the direction perpendicular to the light guide 200. This is schematically depicted in FIG. 3c (side view). In FIG. 3c, schematically an embodiment of the light guide collimator construction 1200 is depicted, wherein the light guide 200 is arranged to collimate light source light 111 of the light source 100 and to provide collimated light 211 (not depicted) to the waveguide 1000, wherein the waveguide 1000 may comprises the cladding 1010 having a low-index of refraction (i.e. lower than of the waveguide 1000).

This ability may especially be used to narrow down the dimensions. For instance, the light guide 200 can be used to couple efficiently light source light 111 in a waveguide 1000 with smaller dimensions, especially with smaller dimensions in a direction perpendicular to the light guide 200.

Figure 3D:
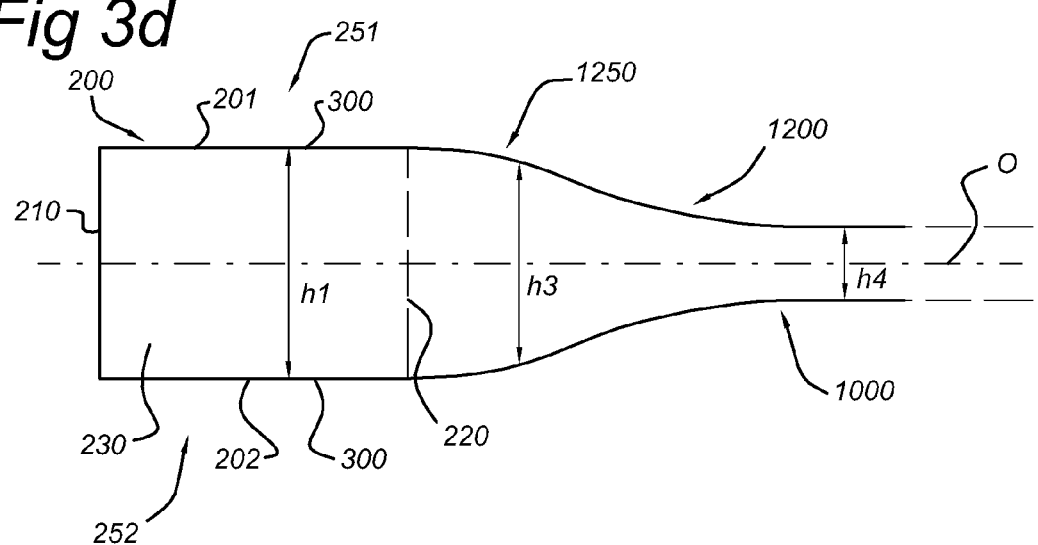

FIG. 3d (side view) schematically depicts a light guide collimator construction 1200 comprising the light guide 200 and a light guide funnel part 1250. The light guide 200 is arranged to collimate light source light 111 of the light source 100 (not depicted) and to provide collimated light 211 to the light guide funnel part 1250. The funnel part 1250 may be an integral part of the light guide 200, but in principle, the funnel part 1250 may also be remote from the light guide 200. The funnel part 1250 can be seen as transition part, allowing narrowing down the height of the device. Here, it is shown that the light guide has height h1, which is smaller than height h4 of the waveguide 1000, in which the light 211 is coupled. The funnel part 1250 has a varying height h3, especially gradually decreasing from height h1 to height h4. FIG. 3d shows the light guide collimator construction 1200 further comprising the waveguide 1000, wherein the light guide 200 and the light guide funnel part 1250 are arranged to provide collimated light 211 to the waveguide 1000.

Figure 3E:
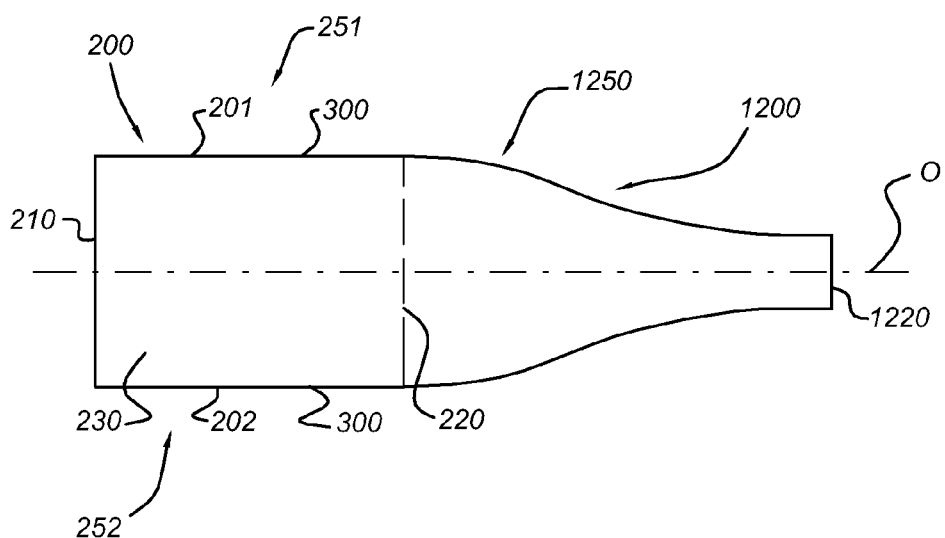

FIG. 3e (side view) schematically depicts the light guide collimator construction 1200 per se (i.e. a "coupler"), having light construction edge window 1220, which may substantially have the same properties and embodiments as described above with respect to the edge window 220. Such device may be used as "coupler" between the light source 100 and the waveguide 1000.

In FIGS. 3d and 3e, embodiments of the light guide collimator construction 1200 are depicted, where the collimator has collimator height h1 and the waveguide has waveguide height h4, and wherein the waveguide height h4 is smaller than the collimator height h1, such as for instance $h1/h4 \leq 2$, or $\leq 4$.

Comparative examples have been performed, with a 1*1 mm Lambertian emitter light source (1 lm) and a light guide of 4 mm thickness. In the table below, and in the accompanying drawings 4a-4j, the outcome of these examples is summarized and depicted, respectively. In these drawings, axes ranging from 0-360, are the x-axis of the luminous intensity plots (candela on y-axes) related to the longitudinal luminous intensity of the device light 211, varying from 0-360°; axes ranging from 0-180, are the y-axis of the luminous intensity plots (candela on x-axes) related to the latitude luminous intensity of the device light 211, varying from 0-180°. These plots are lines plots of the beam cross-section of the light (i.e. beam) escaping from the light guide as device light 211.

Figure 4A:
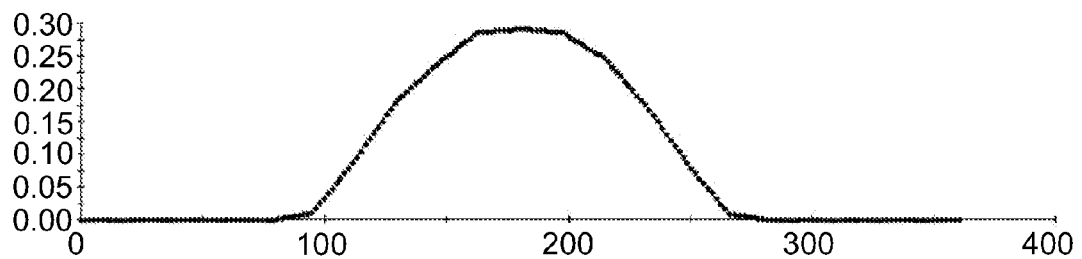
FIGS. 4a-4j show comparative examples of the collimation effects of the grooves comprised by the light guide.
Figure 4B:
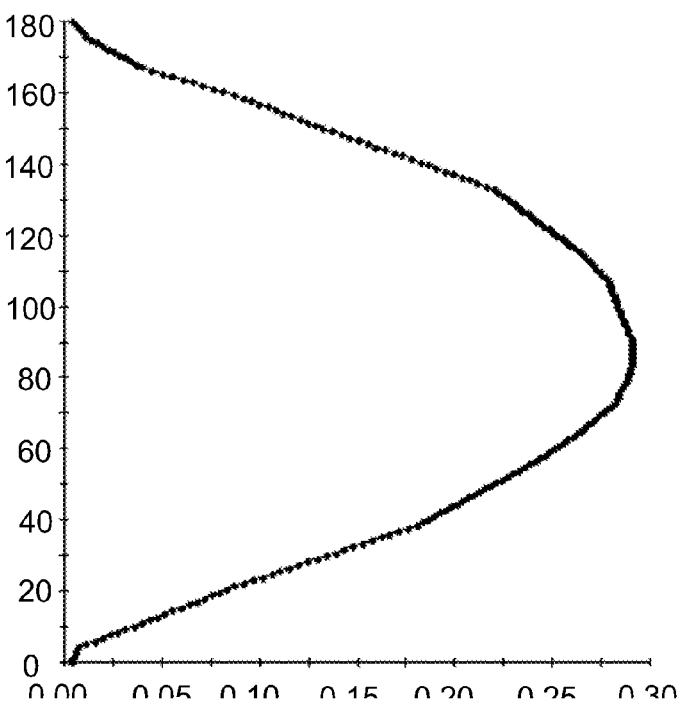
Figure 4C:
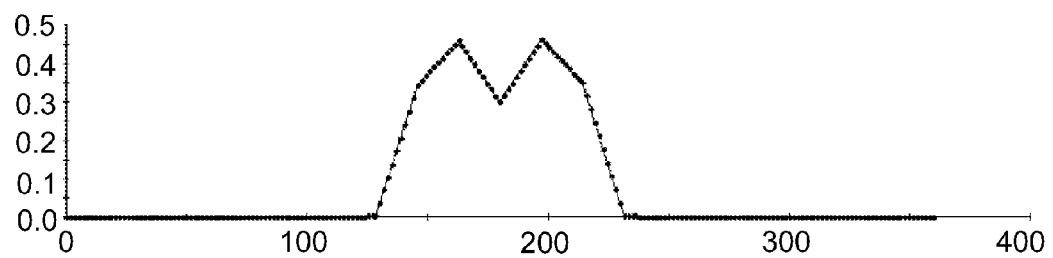
Figure 4D:
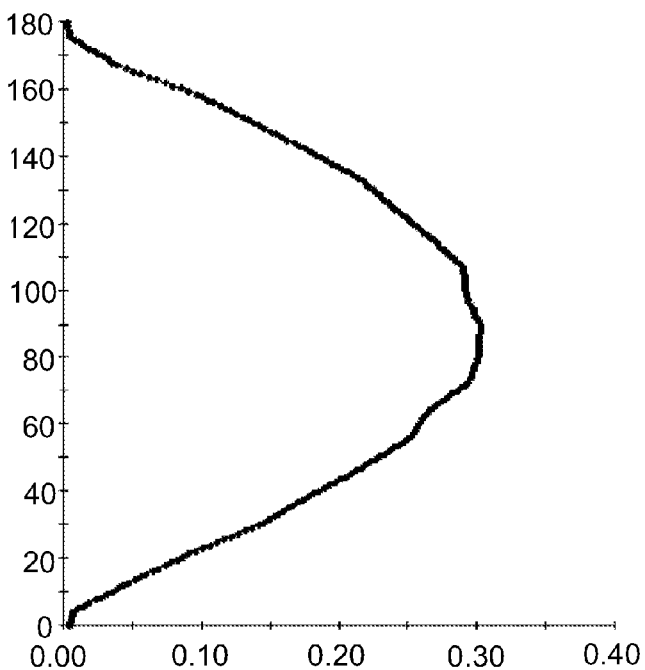
Figure 4E:
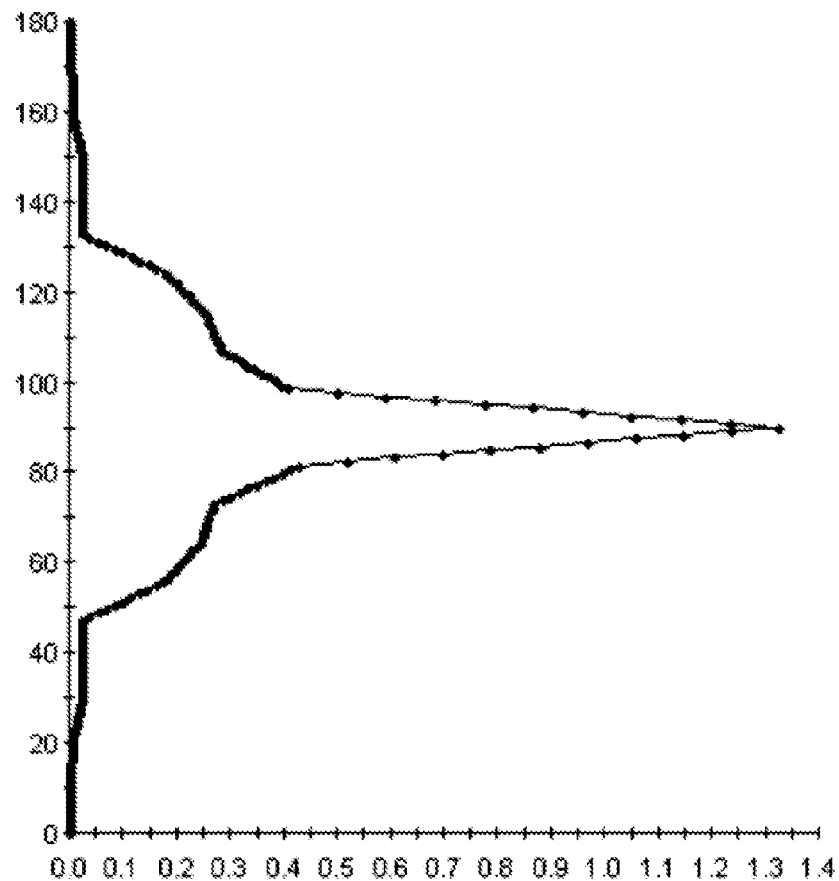
Figure 4F:
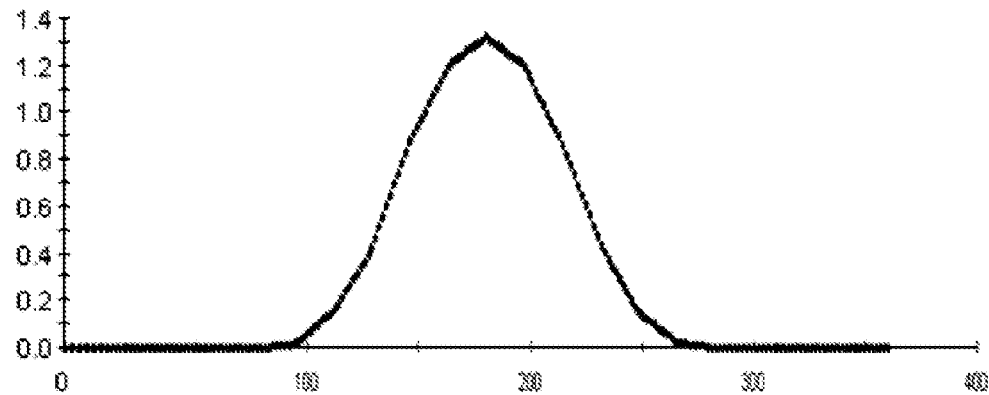
Figure 4G:
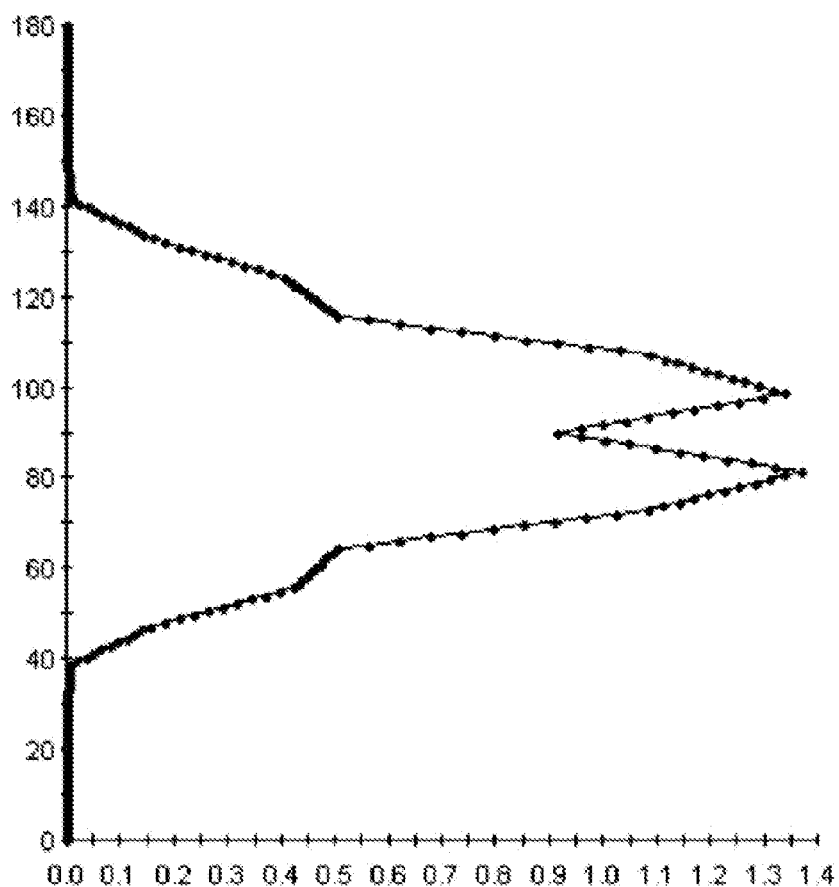
Figure 4H:
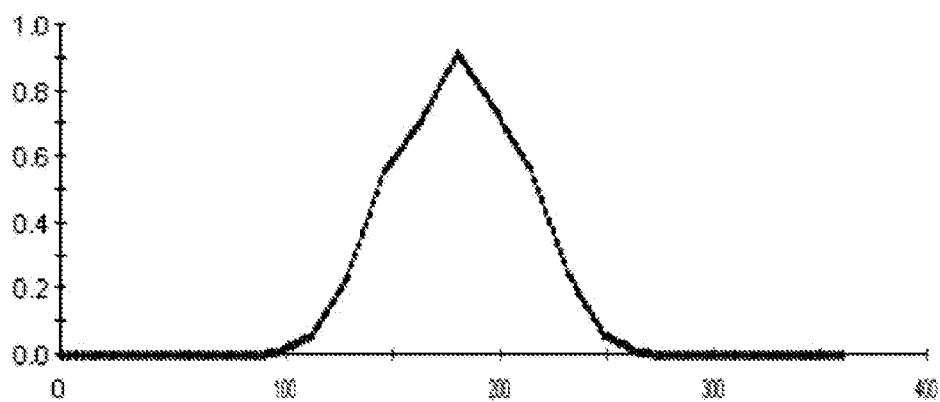
Figure 4I:
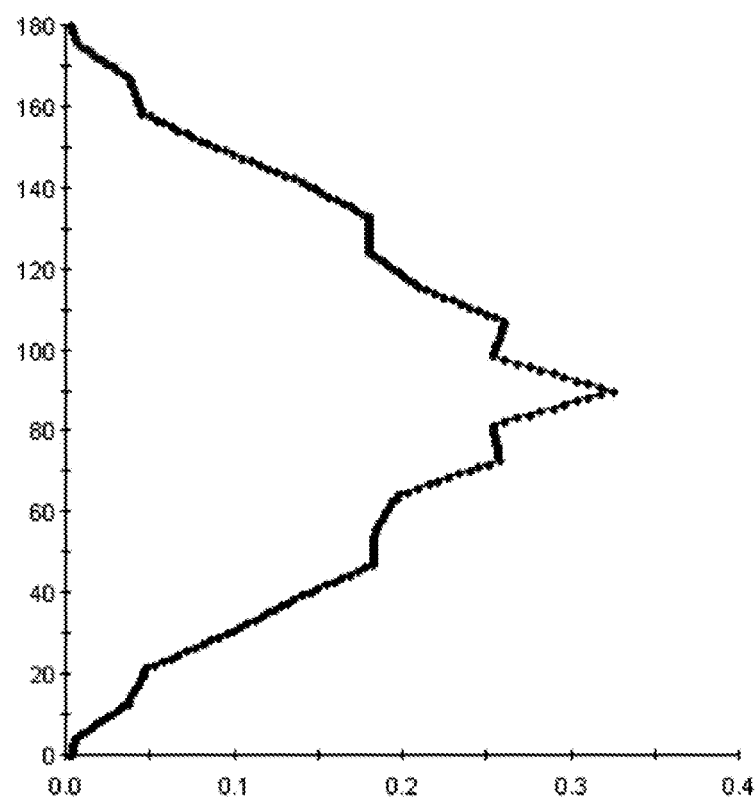
Figure 4J:
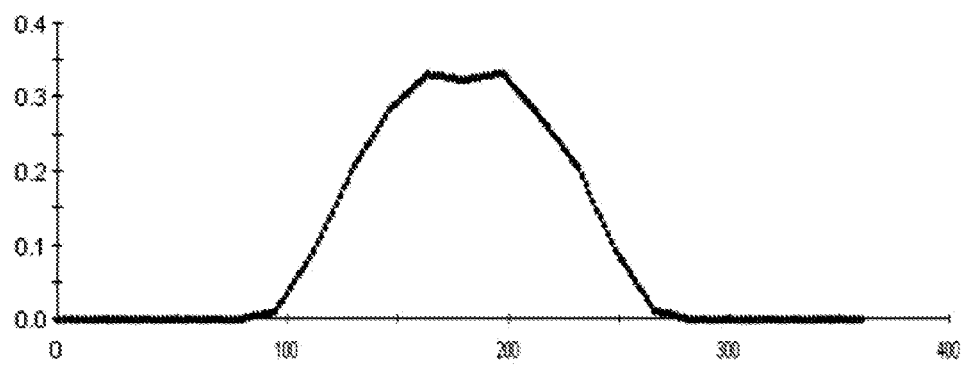

| Example | Collimator shape | Top/bottom surface grooves | Longitudinal FWHM width | Latitude FWHM width |
|---|---|---|---|---|
| 1 (comp.) | light guide 4*40*40 mm[1] | no | no | 2*58° (FIG. 4a) | 2*58° (FIG. 4b) |
| 2 (comp.) | Collimator shape (50° diverging side edges 230, 240) (light guide azimuth angle = 2*25°) | yes | no | 2*41° (FIG. 4c) | 2*58° (FIG. 4d) |
| 3 | light guide 4*40*40 mm[1]; | no | yes (diverging grooves; see FIG. 2a; both surfaces) | 2*42° (FIG. 4e) | 2*6° (FIG. 4f) |
| 4 | light guide 4*40*40 mm[1] | no | yes (diverging grooves divergence position P 1 cm behind light source 100; see FIG. 2b; both surfaces) | 2*40° (FIG. 4g) | 2*24° (FIG. 4h) |
| 5 | light guide 4*40*40 mm[1] | no | yes; both surfaces, but grooves are oriented parallel (i.e. $\omega = 0°$) | 2*57° (FIG. 4i) | 2*47° (FIG. 4j) |

[1]Height h1 (=h2) * length L1(=L2) * width W1(=W2); this applies for all examples, except for example 2, wherein W1 < W2 (i.e. diverging from entrance window to edge window).

From these data, it appears that surprisingly also collimation in the direction perpendicular to the light guide 200 (latitudinal direction) may substantially be improved without diverging surfaces, but substantially only by providing radially oriented (i.e. diverging in the direction from the entrance window to the edge window) grooves 300. It appears that the diverging grooves 300 may provide collimation even to a broad planar "collimator". However, when using substantially parallel grooves 300, collimation is substantially less than when using radially oriented grooves 300.

The term "collimator shape" refers to the classical collimator configuration wherein the side edges diverge from the entrance window to the edge window.

The term "substantially" herein, such as in "substantially all emission" or in "substantially consists", will be understood by the person skilled in the art. Likewise, the term "about" will be understood. The terms "substantially" or "about" may also include embodiments with "entirely", "completely", "all", "exactly", etc., where appropriate. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". For instance, the term "about 2°", may thus also relate to "2°".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is

1. An illumination device arranged to generate illumination device light, the illumination device comprising a lighting unit (2), the lighting unit (2) comprising:
    a light source, arranged to generate light source light, and
    a substantially flat light guide, arranged to collimate the light source light, the light guide having:
        an entrance window and an edge window,
        a first light guide surface and a second light guide surface, which are arranged substantially parallel,
        a first side edge and a second side edge, wherein the first side edge and the second side edge are arranged not to diverge or converge from the entrance window in the direction of the edge window, and
    wherein the entrance window is arranged to receive the light source light of the light source, wherein the edge window is arranged to allow the collimated light source light escape from the light guide as illumination device light, wherein one or more of the first light guide surface and the second light guide surface comprise a plurality of grooves, and wherein the grooves are arranged to diverge in a direction from the entrance window to the edge window.

2. The illumination device according to claim 1, wherein both the first light guide surface and the second light guide surface comprise a plurality of grooves.

3. The illumination device according to claim 1, wherein the plurality of grooves virtually converge at a position (P) coinciding with the light source.

4. The illumination device according to claim 1, wherein the plurality of grooves virtually converge at a position (P) upstream of the light source.

5. The illumination device according to claim 1, wherein the edge window has a slant angle ($\beta$) relative to the first light guide surface or the second light guide surface in the range of 35-105°.

6. The illumination device according to claim 1, wherein the light guide comprises a solid transparent light guide.

7. The illumination device according to claim 1, wherein the first light guide surface and the second light guide surface define a light guide height ($h1$), wherein the first side edge and a second side edge define a light guide width ($W1$), and wherein the width/height ratio is in the range of 1-100.

8. The illumination device according to claim 1, wherein the first side edge and a second side edge define a light guide width ($W1$) and wherein first side edge and a second side edge have side edge length ($L1$), wherein width/length ratio ($W1/L1$) is in the range of 0.5-2.

9. A substantially flat light guide, arranged to collimate light source light of a light source, the light guide having:
    an entrance window and an edge window,
    a first light guide surface and a second light guide surface, which are arranged substantially parallel,
    a first side edge and a second side edge, wherein the first side edge and the second side edge are arranged not to diverge or converge from the entrance window in the direction of the edge window, and
    wherein the entrance window is arranged to receive the light source light of the light source, wherein the edge window is arranged to allow the collimated light source light escape from the light guide as illumination device light, wherein one or more of the first light guide surface and the second light guide surface comprise a plurality of grooves, and wherein the grooves are arranged to diverge in a direction from the entrance window to the edge window.

10. A light guide collimator construction comprising a light guide according to claim 9 and a light guide funnel part, wherein the light guide is arranged to collimate light source light of a light source and to provide collimated light to the light guide funnel part.

11. The light guide collimator construction according to claim 10, further comprising a waveguide, wherein the light guide and the light guide funnel part are arranged to provide collimated light to the waveguide.

12. The light guide collimator construction according to claim 10, wherein the collimator has a collimator height ($h1$) and wherein the waveguide has a waveguide height ($h4$), wherein the waveguide height ($h4$) is smaller than the collimator height ($h1$).

13. A light guide collimator construction comprising a light guide according to claim 9, wherein the light guide is arranged to collimate light source light of a light source and to provide collimated light to a waveguide, wherein the waveguide comprises a cladding having a low-index of refraction.

* * * * *